United States Patent [19]

Takizawa

[11] Patent Number: 5,526,466
[45] Date of Patent: Jun. 11, 1996

[54] SPEECH RECOGNITION APPARATUS

[75] Inventor: Yumi Takizawa, Nara, Japan

[73] Assignee: Matsushita Electric Industrial Co., Ltd., Japan

[21] Appl. No.: 225,630

[22] Filed: Apr. 11, 1994

[30] Foreign Application Priority Data

Apr. 14, 1993 [JP] Japan .................................. 5-087127
Sep. 1, 1993 [JP] Japan .................................. 5-217286

[51] Int. Cl.⁶ ..................................................... G10L 5/06
[52] U.S. Cl. .......................................... 395/2.62; 395/2.6
[58] Field of Search ........................... 395/2.25, 2.4, 395/2.45, 2.46, 2.47, 2.54, 2.57, 2.62, 2.63; 381/41, 43

[56] References Cited

U.S. PATENT DOCUMENTS

| | | | |
|---|---|---|---|
| 4,092,493 | 11/1976 | Rabiner et al. | 395/2.46 |
| 4,239,936 | 12/1980 | Sakoe | 395/2.42 |
| 4,454,586 | 11/1981 | Pirz et al. | 395/2.54 |
| 4,736,429 | 6/1984 | Niyada et al. | 395/2.63 |
| 4,802,223 | 1/1989 | Lin et al. | 395/2.16 |
| 4,918,731 | 4/1990 | Muroi | 395/2.62 |
| 4,991,216 | 2/1991 | Fujii et al. | 395/2.63 |
| 5,025,471 | 6/1991 | Scott et al. | 395/2.46 |

Primary Examiner—Allen R. MacDonald
Assistant Examiner—Thomas J. Onka
Attorney, Agent, or Firm—Beveridge, DeGrandi, Weilacher & Young

[57] ABSTRACT

At the time of training reference speech, the relationship between durations of each recognition unit is obtained by a duration training circuit and, at the time of recognizing speech, a beginning and an end of input speech is detected by a speech period sensing circuit, and then by using the relationship and the input speech period length, the durations of the recognition units in the input speech are estimated. Next, the reference speech and the input speech are matched by the matching means by using the calculated estimation values in such a manner that the recognition units have a duration close to that of the estimated values.

8 Claims, 5 Drawing Sheets

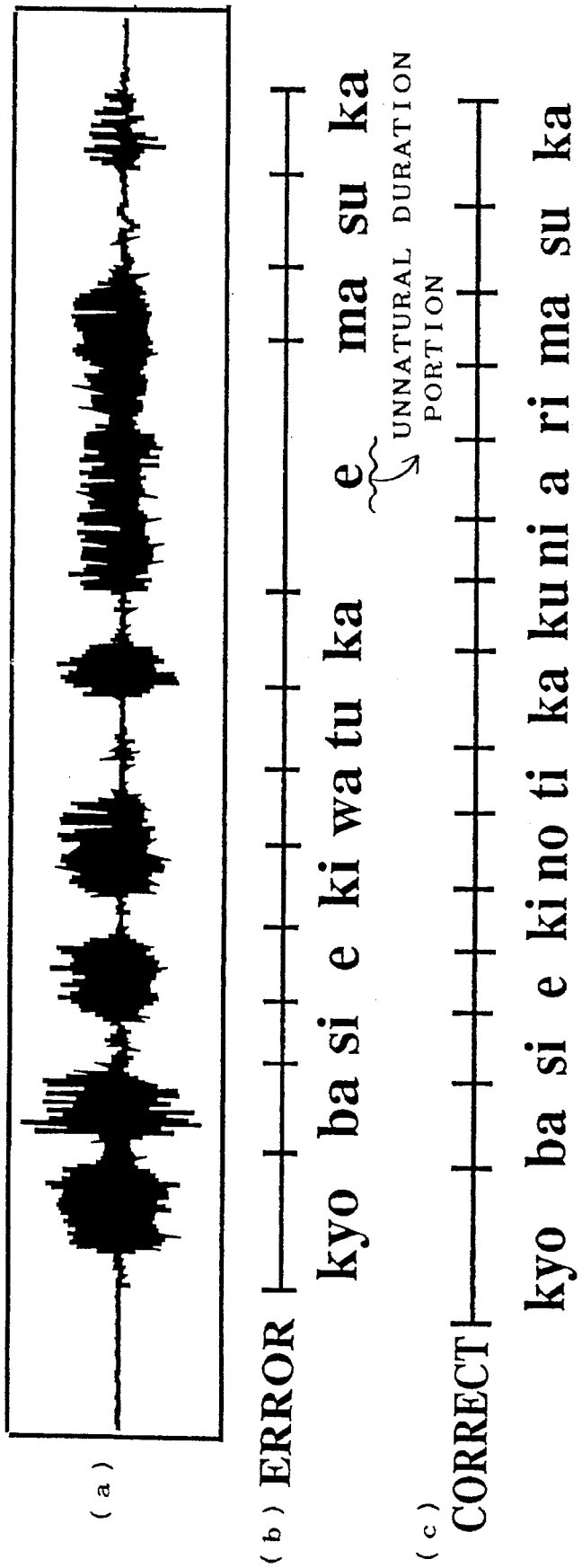

SPEECH RECOGNITION APPARATUS

BACKGROUND OF THE INVENTION

1. Field Of The Invention

The present invention relates to a speech recognition apparatus.

2. Description Of The Related Art

The recognition technology for speech recognition apparatus where the speaker is not specified has been advancing to the extent where speech recognition apparatus may have a large vocabulary of a hundred to a thousand words, rather than a small vocabulary of just ten or twenty words. With small vocabulary word recognition, a large number of speakers will pronounce all the words in the vocabulary during a reference speech training process. All of these words are then recognized as a single recognition unit. However, with large vocabulary word recognition or continuous speech recognition for recognizing a number of continuously generated words, if the kind of training described above is carried out, useful training for the vocabulary of words becomes difficult. Therefore, at the training process in large vocabulary recognition and continuous speech recognition, the vocabulary, i.e., word, connected words or sentence, are divided into smaller periods i.e. syllable or phoneme etc. and training is carried out on each period as the recognition unit.

At recognition, a method is adopted whereby recognition results for words are executed by successively connecting he recognition results for every recognition unit. In this way, it is not necessary to generate all the words at learning so that learning is possible by just generating a word set including at least one recognition unit. This is laid out in detail in the following documents.

"Recognition of Spoken Words Based on VCV Syllable Unit" Ryohei Nakatsu, Masaki Kohda, The Institute of Electronics, Information and Communication Engineers of Japan Journal Vol. J61-A No. 5 pp. 464–471 (1978.5); and "Syntax Oriented Spoken Japanese Understanding System" Yoshihisa Ohguro, Yasuhide Hashimoto, Seiichi Nakagawa, Electro-communications society technical journal, SP88-87, pp55–62 (1988).

However, in the examples in the aforementioned prior art technical papers, because the reference speech is corresponding to the syllable units rather than word units, information about the relationship between each of the syllables within a word is not reflected in the syllable reference speech, while the information is reflected in word reference speech. For example, the information about syllable duration does not reflect the relationship between each of the syllables. Therefore, even if the matching period for each of the syllables within the same word are uneven and unnatural, if the distance value is small, recognition including error is output.

As shown in FIG. 5 the (a) represents voice waveforms, the (b) represents an incorrect recognition result "kyo"ba"si"e"ki"wa"tu"ka"e"ma"su"ka" which is output by the conventional recognition method using the syllable recognition unit. As mentioned above the conventional method does not use syllable duration relationship and therefore though the second "e" has an unnaturally long duration, this recognition result is output as a correct recognition.

Meanwhile the (c) represents the correct recognition result "kyo"ba"si"e"ki"no"ti"ka"ku"ni"a"ri"ma"su"ka" which is output by the present invention recognition method using the syllable recognition unit and duration relationship as described below. There is no unnatural duration and no unnatural syllable matching period.

SUMMARY OF THE INVENTION

It is therefore the object of this invention, by obtaining the relationship between the duration of each of the recognition units beforehand and estimating the duration of the recognition units using the obtained relationship and the length of the input speech, and by then using this estimated value, to set matching periods which take into consideration the relationship between each of the recognition units, to provide a speech recognition apparatus which achieves greater efficiency by only selecting matching results when the matching period for each syllable within the word is realistic.

In order to achieve the aforementioned object, in this invention a speech recognition apparatus comprises a speech period sensing circuit for sensing the start and end of the inputted speech, a duration training circuit for calculating the relationship between the durations of the recognition units using factors which influence the duration of the recognition units, a duration estimation circuit for estimating the duration of each of the recognition units for the inputted speech by using the relationship between the sensed speech periods for the inputted speech and the calculated duration of the recognition units and a matching circuit for matching or deciding recognition results by using the estimated durations.

By using this kind of construction, recognition candidates are brought forward only when the matching period for each syllable within the same word is realistic, so that a highly efficient speech recognition apparatus is provided.

BRIEF DESCRIPTION OF THE DRAWINGS

FIG. 5 is a graph showing the voice waveform and the incorrect recognition result of the conventional method and the correct recognition result of the present invention.

DETAILED DESCRIPTION OF THE PREFERRED EMBODIMENTS

The following is a description, with reference to the diagrams, of a first embodiment according to claims 1 to 7 of the present invention.

Figure 1:
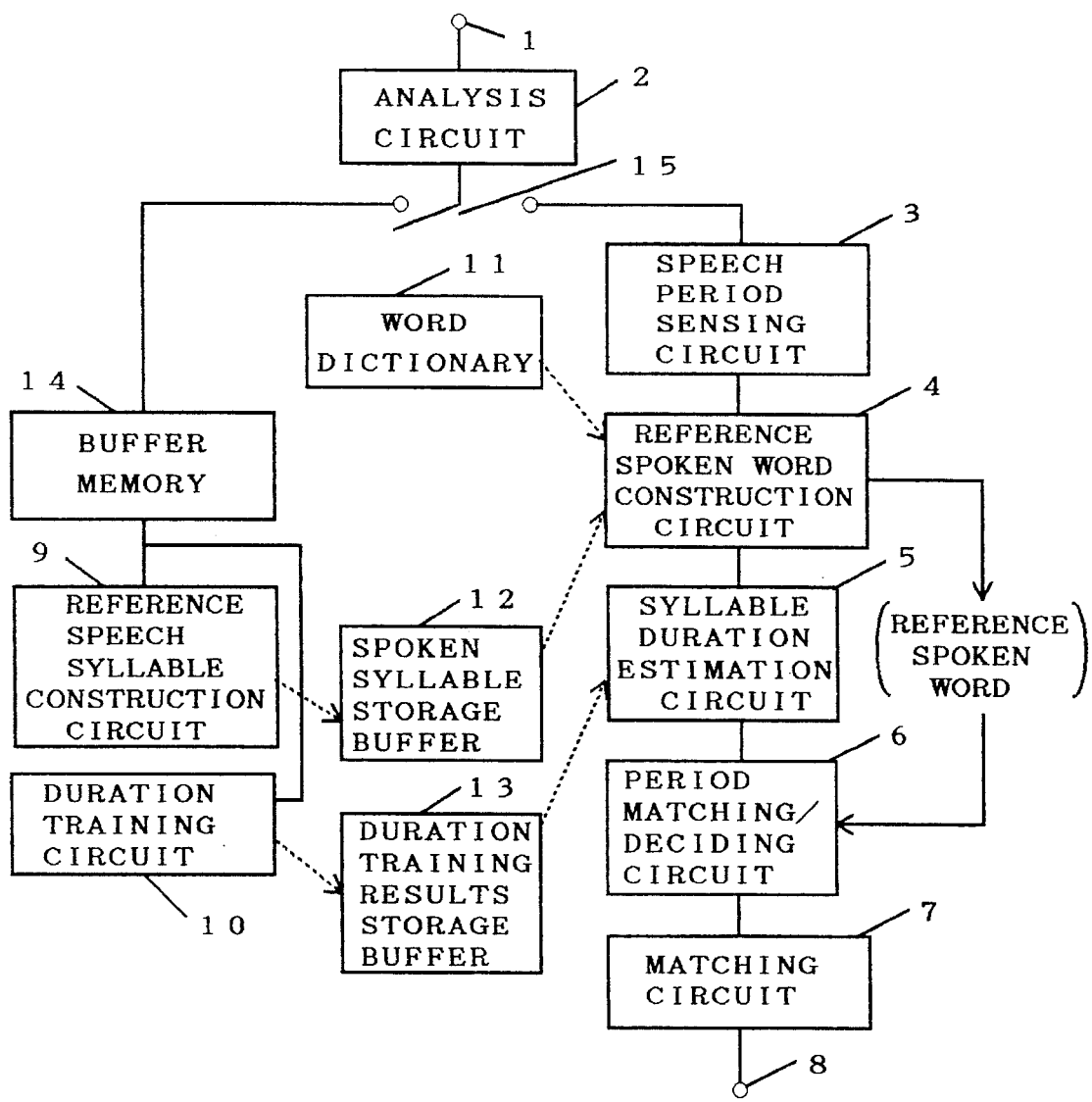
FIG. 1 is a block diagram of a speech recognition apparatus for an embodiment of this invention.
Figure 2:
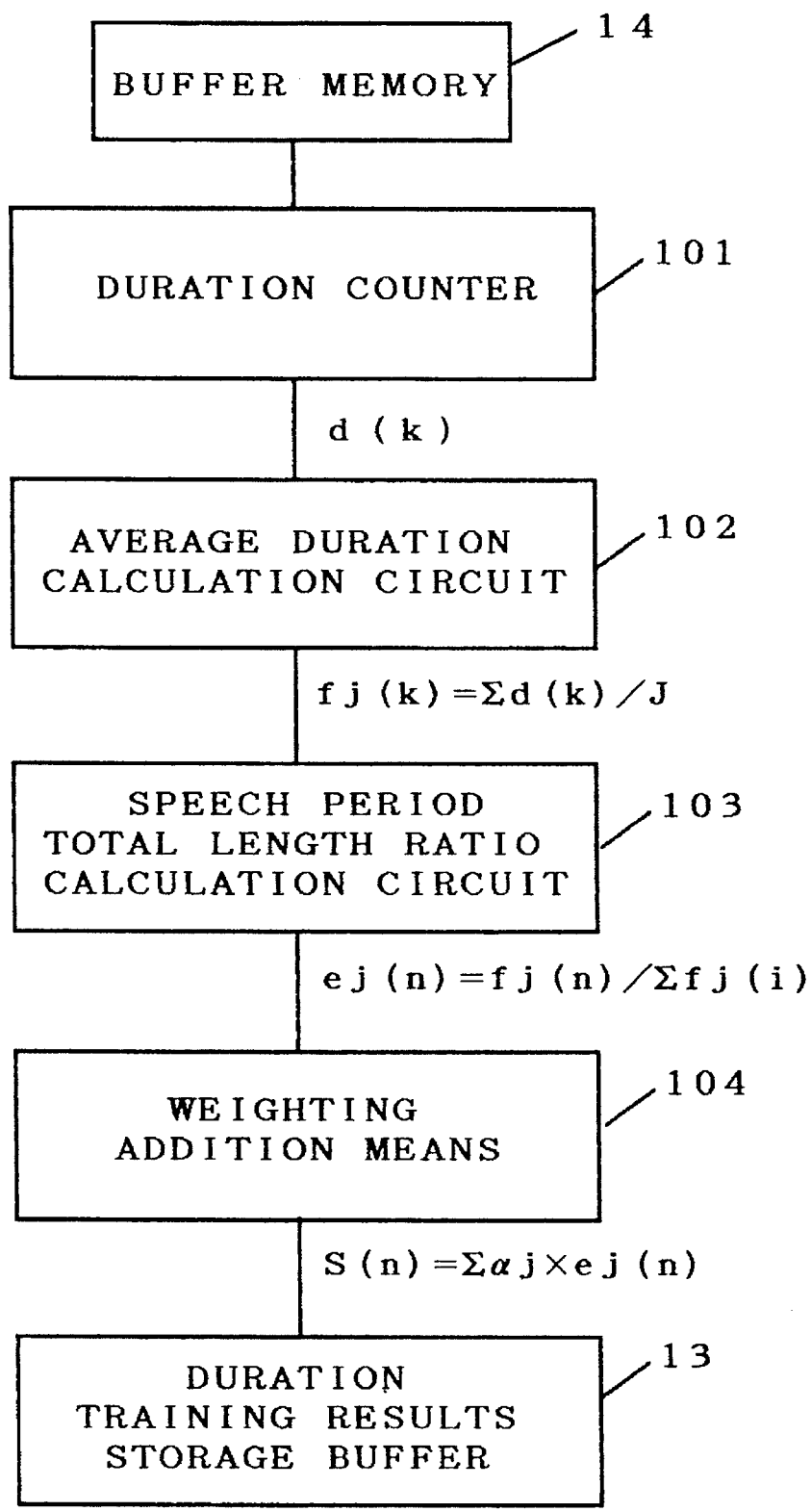
FIG. 2 is a block diagram of the duration training circuit for one embodiment of this invention.
Figure 3:
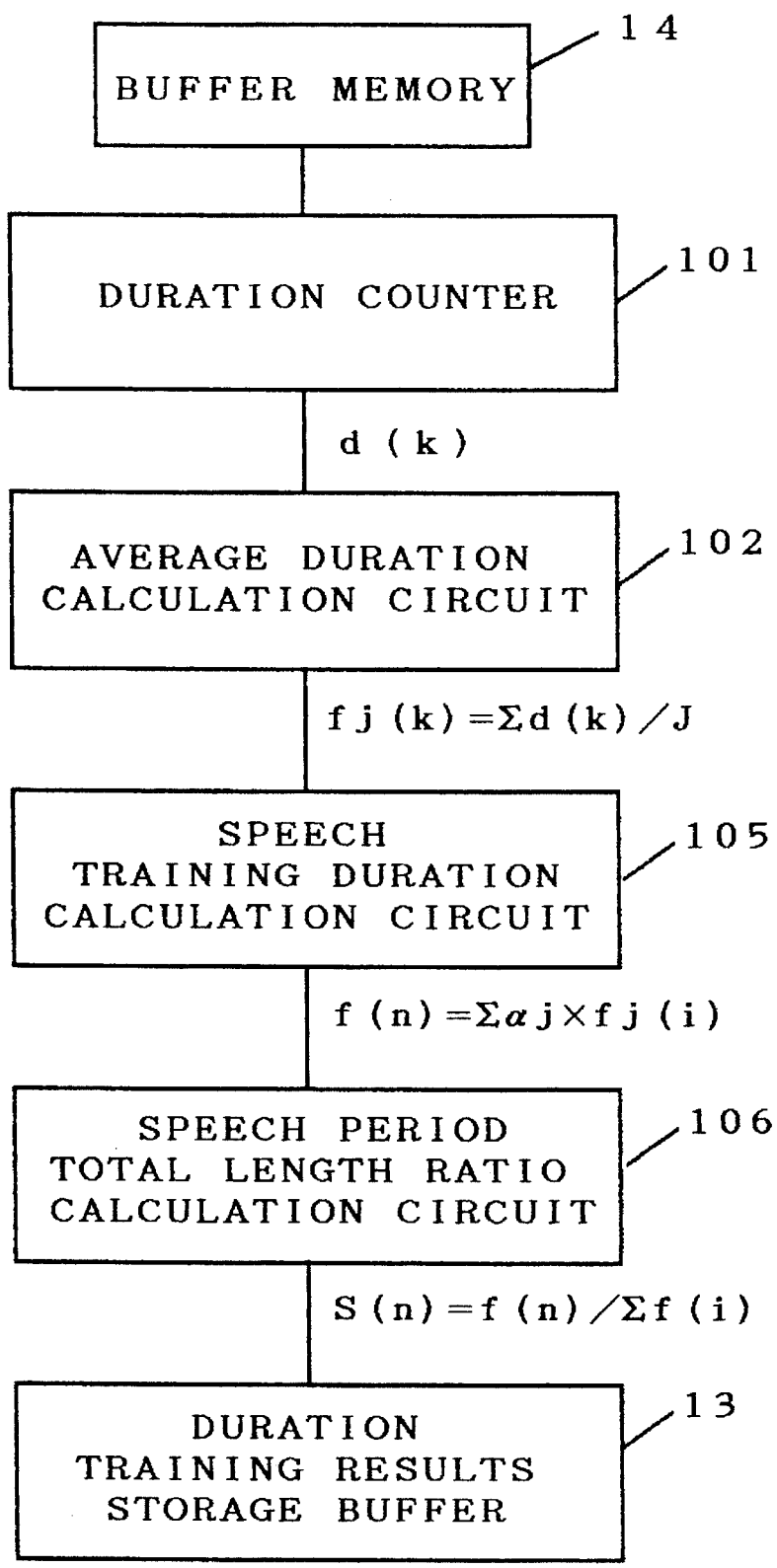
FIG. 3 is a block diagram of the duration training circuit for another embodiment of this invention.

FIG. 1 is a block diagram for a spoken word recognition apparatus for an embodiment according to claims 1 to 7 of this invention. In FIG. 1, numeral 1 indicates a speech input terminal, numeral 2 indicates an analysis circuit, numeral 3 indicates a speech period sensing circuit, numeral 4 indicates a reference spoken word construction circuit, numeral 5 indicates a syllable duration prediction circuit, numeral 6 indicates a decision of matching period circuit, numeral 7 indicates a matching circuit, numeral 8 indicates a recognition result output terminal, numeral 9 indicates a reference speech syllable construction circuit, numeral 10 indicates an duration training circuit, numeral 11 indicates a word dictionary, numeral 12 indicates a reference spoken syllable storage buffer, numeral 13 indicates a duration training results storage buffer, numeral 14 indicates a buffer memory and numeral 15 indicates a switch. Also, the duration training circuit 10 of claim 4 is different for that of claim 5 of this invention. FIG. 2 is a detailed view of a duration training circuit 10 for an embodiment for the claim 4 of this invention. In FIG. 2, numeral 101 indicates a duration counter, numeral 102 indicates an average duration calculation circuit, numeral 103 indicates a speech period total length ratio calculating circuit and numeral 104 indicates a weighting addition circuit. FIG. 3 is a detailed view of a duration training circuit 10 for an embodiment for the claim 5 of this invention. In FIG. 3, numeral 101 indicates an duration counter, numeral 102 indicates an average duration calculation circuit, numeral 105 indicates a speech training duration calculation circuit and numeral 106 indicates a speech period total length ratio calculating circuit. Blocks which are identical to blocks in FIG. 2 are given the same numbers. The following is a description of the speech recognition operation according to claims 1, 2, 3, 4, 6 or 7 of this invention.

During reference speech training, previously prepared words of reference speech are split up into single syllables and each syllable is input to the speech input terminal 1. This is then analyzed for spectral information which is required by the analysis circuit 2 for recognition purposes. If, for example, an LPC Cepstraum method is used, the spectral information would be calculated from characteristic parameters for an LPC Cepstraum function with a prescribed number being in one group for each frame and this would then be saved in the buffer memory 14. This analysis process is then repeated until a prescribed number of items of speech training data have been dealt with.

The data stored in the buffer 14 is then made into clusterings at the reference speech syllable construction circuit 9 and the item of data at the center of each cluster is stored in the reference syllable storage buffer 12.

Then, at the duration learning circuit 10, the data stored in the buffer 14 is divided up into three classifications, (1) each type of the current syllable within the word, (2) each type of the preceding syllable within the word and (3) each type of syllable of following the above syllable within the word, and the average duration $f_1(n)$, $f_2(n)$ and $f_3(n)$ for each of these classifications is then calculated. To do this, first, the duration of each item of syllable data is calculated by the duration counter 101. For example, the number of items in an LPC Cepstraum coefficient series made for prescribed groups of data items may be counted. Next, the average duration of each type of syllable is calculated at the average duration calculation circuit 102. The ratio of the total length of the speech period to the duration of each of the syllables is then calculated, for each factor, by the speech period total length ratio calculating circuit 103 with equation 5 by using the average duration corresponding to each syllable and the average duration of the total length of the speech period.

$$e_j(n) = \frac{f_j(n)}{\sum_{i=1}^{N} f_j(i)} \quad \text{[Equation 5]}$$

$f_j(n)$: The average duration of all syllables as nth syllable for factor j.

N: Total number of syllables in the whole speech period.

$e_j(n)$: the speech period total length ratio of the duration of nth syllable at factor j.

A weighting is then added at the weighting addition circuit 104 to the average durations calculated above in the way shown in equation 6, so as to take all of the factors into consideration (In the case of this embodiment, these are the three factors of the preceding syllable type, the current syllable type and the following syllable type). The weighted results are then stored in the duration training results storage buffer 13 for every recognition word.

$$S(n) = \sum_{j=1}^{3} \alpha_j \times e_j(n) \quad \text{[Equation 6]}$$

S(n): the duration estimation value for the nth syllable when the total length of the speech period is taken to be 1.

This equation is a specific form of the more generic equation $$S(n) = \sum_{j} \alpha_j \frac{f_j(n)}{\sum_{i=1}^{N} f_j(i)}$$

where fj(n) is the average duration of all recognition units as the nth recognition unit for factor j, N is the total number of recognition units included in one speech period, αj is the weighting coefficient for each factor, and S(n) is the duration estimation value for each recognition unit when the total speech period length is 1.

This weighting α can be set up, for example, so as to reflect the degree of influence of the duration of each of the factors. Conventionally, by obtaining a partial correlation coefficient for each of the three factors (preceding syllable type, current syllable type and following syllable type) the extent of the effect of the syllable duration of each of the factors can be investigated. According to "Syllable Duration Prediction for Speech Recognition" ICSLP92 Vol. 2 pp. 1371–1374, put forward by Takizawa and Tsuboka, the partial correlation coefficient values for each of the factors, are given in Table 1.

TABLE 1

| Factor | partial coefficient value for the syllable duration for each of the factors. | | |
|---|---|---|---|
| | Preceding syllable type | Current syllable type | Following syllable type |
| Partial correlation coefficient | 0.490 | 0.697 | 0.521 |

In order to maintain the partial coefficient ratio between these three items, the partial coefficient values in table 1 are adapted so as their total becomes 1, and from left, become approximately 0.28, 0.41 and 0.31 and these values are then taken to be $\alpha_1$, $\alpha_2$ and $\alpha_3$.

In the above example, partial correlation coefficients were used so as to ensure that the degree of influence of the duration of each factor was reflected by the value α. However, fixed values which bear no relation to the factor j may also be used so as to make the calculation process more compact. In this embodiment there are three factors, so the value α could be made to be ⅓=0.33, a number which bears no relation to j.

At the time of recognition, the speech is inputted to the input terminal 1 and spectral information is analyzed for every frame at the analyzing circuit 2. The analyzing method is the same as that at the time of training. A speech period is then sensed at the speech period sensing circuit 3 using the 0th LPC Cepstraum coefficient (the 0th coefficient is the speech power information) from the analysis circuit 2. The speech period conditions are in the following two conditions.

(1) Speech power (0th coefficient value) is larger a predetermined value.
(2) more than a certain number of frames fulfilling the condition (1) continue.

The name of the word which is to be recognized is recorded in the word dictionary 11 as a row of syllables. Reference word speech is then made at the reference spoken word construction circuit 4 by linking together reference speech syllables present in the reference syllable storage buffer 12 in accordance with the syllable rows for each word in the word dictionary 11.

Syllable duration is then estimated at the duration estimation circuit 5 in accordance with equation 2 as follows:

$$\hat{d}(n) = L \times S(n)$$

where $\hat{d}(n)$ is the duration estimation value for the nth recognition unit, and L is the total speech period length using the duration estimation value $S(n)$ of each recognition unit for the total length of the speech period and the speech period length L, obtained at the time of training.

Next, at the period matching/deciding circuit 6, the boundary between the n−1th syllable and the nth syllable is assumed to be the expression $k(n-1)$ shown in equation 7. The matching extent is limited provided that the end i of the n−1th syllable matching period exists within ±β of the aforementioned boundary (equation 8). The distance D is then calculated at the matching circuit 7 with the end of each syllable falling within the aforementioned matching range by matching from the start of the speech to its end according to (Equation 9).

$$k(n-1) = \sum_{i=1}^{n-1} \hat{d}(i) \qquad \text{[Equation 7]}$$

$$k(n-1) - \beta < i < k(n-1) + \beta \qquad \text{[Equation 8]}$$

(where β is a constant)

$$Dn(i) = \min\ Dn-1(i-1)+dn(i)\ Dn(i-1)+dn(i) \qquad \text{[Equation 9]}$$

Dn(i): distance between syllables row which are from first up to ith frame while in the ith frame from first up to nth syllable and the input speech dn(i): distance between an nth syllable of reference speech at i frames and the input speech. In the processes going from the reference spoken word construction circuit 4 to the matching process with regards to all of the words recorded in the word dictionary, the word for which the distance D becomes a minimum is taken as the final recognition result and these recognition results are output from the recognition results output circuit 8. Characteristic parameters are output from the switch 15 to the buffer 14 when training, and from the switch 15 to the speech period sensing circuit 3 when recognizing.

Therefore, according to this embodiment, the average syllable duration is calculated at the duration training circuit, taking into account the factors which influence the syllable duration. This is then used for training the duration of each of the syllables in accordance with equation 1 for the case where the total length of the speech period is taken to be 1. Then, at the syllable duration estimation circuit, the duration of every recognition unit for the input speech is then estimated using the speech period length of the input speech and the average duration. By then matching within a certain range centered around the duration estimation by the matching circuit, it becomes possible to establish candidates for recognition only for cases where the difference as to the duration of every syllable within the same input speech is realistic. This, in turn, makes the apparatus more efficient. At the same time, by limiting the matching periods, high speed matching processing becomes possible.

Next, the operation of another speech recognition apparatus according to claims 1, 2, 3, 5, 6, or 7 of this invention will be described.

During reference speech training, previously prepared words of reference speech are split up into single syllables and speech every each syllable is input to the speech input terminal 1. This is then analyzed for spectral information which is required by the analysis circuit 2 for recognition purposes. If, for example, an LPC Cepstraum method is used, the spectral information would be calculated from characteristic parameters for an LPC Cepstraum function with a prescribed number being in one group for each frame and this would then be saved in the buffer memory 14. This analysis process is then repeated until a prescribed number of items of speech training data have been dealt with.

The data stored in the buffer 14 is then made into clusterings at the reference speech syllable construction circuit 9 and the item of data at the center of each cluster is stored in the reference syllable storage buffer 12.

Then, at the duration learning circuit 10, the data stored in the buffer 14 is divided up into three classifications, (1) every each type of the current syllable syllable within the word and (3) each type of syllable of following the above syllable within the word, and the average duration $f_1(n)$, $f_2(n)$ and $f_3(n)$ for each of these classifications is then calculated. To do this, first, the duration of each item of syllable data is calculated by the duration counter 101. For example, the number of items in an LPC Cepstraum coefficient series made for prescribed groups of data items may be counted. Next, the average duration of each type of syllable is calculated at the average duration calculation circuit 102. Next, as is shown in equation 10, the average duration values are all added with weights for each of the factors by the speech training duration calculation circuit 105. In this way, the duration of each of the syllables in the training speech can be calculated. The value for the weighting is obtained in the same way as for the previous embodiment.

$$f(n) = \sum_{j=1}^{3} \alpha j \times fj(n) \qquad \text{[Equation 10]}$$

f(n): duration estimation value for nth recognition unit in training speech $f_j(n)$: The average duration of all syllables as nth syllable for factor j.

Next, the speech period total length ratio is calculated in accordance with equation 3 as follows:

$$S(n) = \frac{f(n)}{\sum_{i=1}^{N} f(i)}$$

where S(n) is the duration estimation value for each recognition unit when the total speech period length is 1, and N is the total number of recognition units included in one speech period by speech period total length ratio calculation circuit 103. The results obtained for every recognition word are then stored in the duration training results storage buffer 13.

At the time of recognition, the speech is input to the input terminal 1 and spectral information is analyzed for every frame at the analyzing circuit 2. The analyzing method is the same as that at the time of training. A speech period is then sensed at the speech period sensing circuit 3 using the 0th LPC Cepstraum coefficient (the 0th coefficient is the speech power information) from the analysis circuit 2. The speech period conditions are in the following two conditions.

(1) Speech power (0th coefficient value) is larger a predetermined value.
(2) more than a certain number of frames fulfilling the condition (1) continue.

The name of the word which is to be recognized is recorded in the word dictionary 11 as a row of syllables. Reference word speech is then made at the reference spoken word construction circuit 4 by linking together reference speech syllables present in the reference syllable storage buffer 12 in accordance with the syllable rows for each word in the word dictionary 11.

Syllable duration is then estimated at the duration estimation circuit 5 in accordance with equation 4 as follows:

$$d(n)=L \times S(n)$$

where d(n) is the duration estimation value for the nth recognizable unit and L is the total speech period length using the duration estimation value S(n) of each recognition unit for the total length of the speech period and the speech period length L, obtained at the time of training.

Next, at the period matching/deciding circuit 6, the boundary between the n−1th syllable and the nth syllable is assumed to be the expression k(n−1) shown in equation 7 of the previous embodiment. The matching extent is limited provided that the end i of the n−1th syllable matching period exists within $\pm \beta$ of the aforementioned boundary (equation 8 of the previous embodiment). The distance D is then calculated at the matching circuit 7 with the end of each syllable falling within the aforementioned matching range by matching from the start of the speech to its end according to (Equation 9 of the previous embodiment).

With regards to all of the words recorded in the word dictionary in the processes going from the reference spoken word construction circuit 4 to the matching process, the words for which the distance D becomes a minimum are taken as the final recognition results and these recognition results are outputted from the recognition results output circuit 8. Characteristic parameters are outputted from the switch 15 to the buffer 14 when training, and from the switch 15 to the speech period sensing circuit when recognizing.

Therefore, according to this embodiment, the average syllable duration is calculated at the duration training circuit, taking into account the factors which influence the syllable duration. This is then used for training the duration of each of the syllables in accordance with equation 3 for the case where the total length of the speech period is taken to be 1. Then, at the duration estimation circuit, the duration of every recognition unit for the input speech is then estimated using the speech period length of the input speech and the average duration. By then matching within a fixed range centered around the duration estimation made at the matching circuit, it becomes possible to establish candidates for recognition only for cases where the difference in duration of every syllable within the same input speech is realistic. This, in turn, makes the apparatus more efficient. At the same time, by limiting the matching periods, high speed matching processing becomes possible.

In this embodiment, as is shown in claim 7, the matching periods for each of the syllables are decided by using the estimated syllable durations and the matching for each of the syllables is executed within these matching periods. However, other methods of adding a weighting may also be considered. For example, weighting may be given to the distance dn(i) where (dn(i) represents the distance between the nth syllable of reference speech in the frame i and the input speech) shown in Equation 9, so that the smaller the matching distance D becomes, the closer the matching period of each syllable is to the estimated duration.

Figure 4:
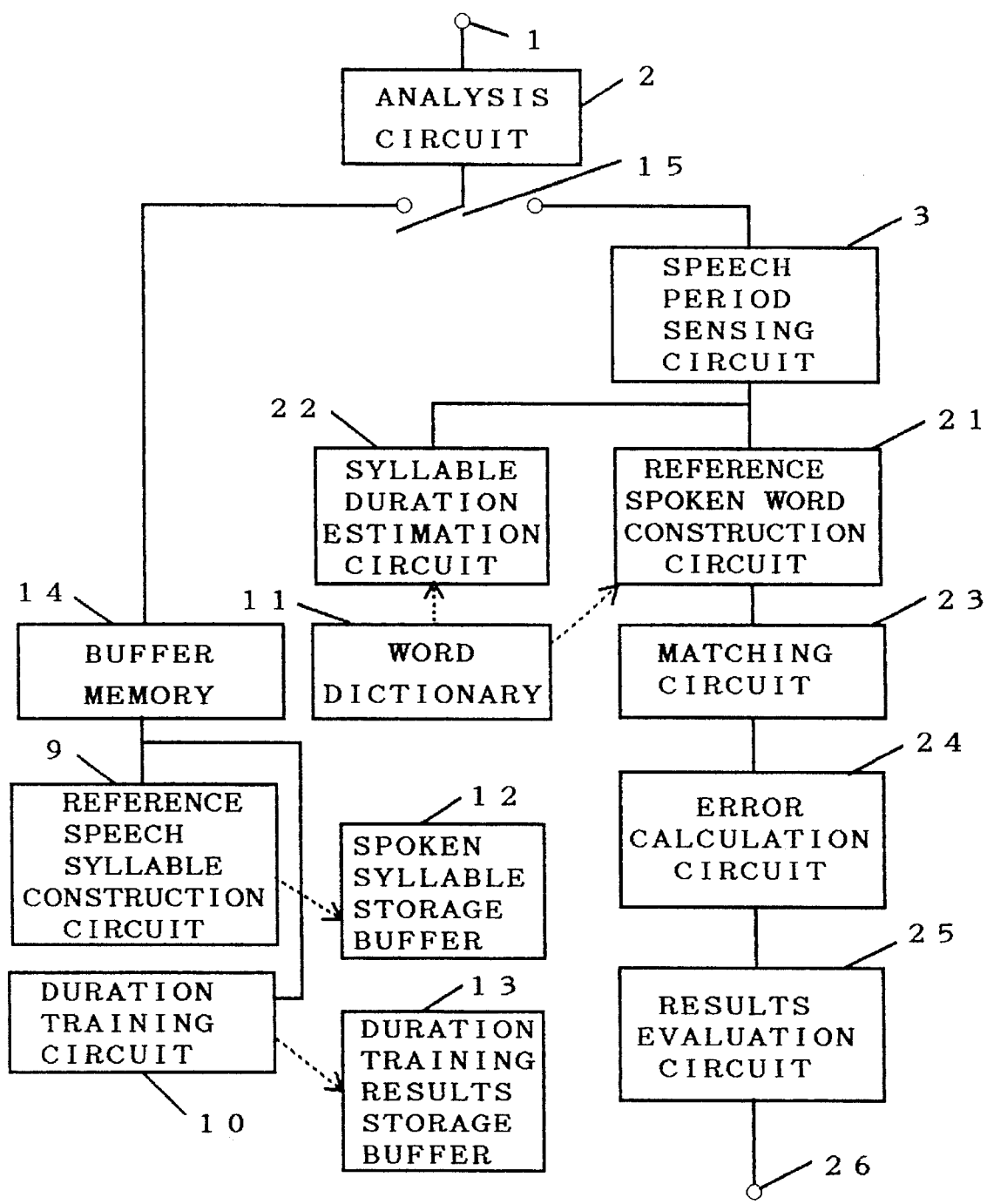
FIG. 4 is a block diagram of a speech recognition apparatus for yet another embodiment of this invention.

The following is a description, with reference to the diagrams, of an embodiment of this invention according to claims 1, 2, 3, 4 and 8 of this invention. FIG. 4 is a block diagram of a word speech recognition apparatus for an embodiment according to claim 8 of this invention. In FIG. 4, numeral 1 indicates a speech input terminal, numeral 2 indicates an analysis circuit, numeral 3 indicates a speech period sensing circuit, numeral 21 indicates a reference spoken word construction circuit, numeral 22 indicates a syllable duration estimation circuit, numeral 23 indicates a matching circuit, numeral 24 indicates an error calculation circuit, numeral 25 indicates a results evaluation circuit, numeral 26 indicates a recognition result output terminal, numeral 9 indicates a reference speech syllable construction circuit, numeral 10 indicates an duration training circuit, numeral 11 indicates a word dictionary, numeral 12 indicates a reference spoken syllable storage buffer, numeral 13 indicates an duration training results storage buffer, numeral 14 indicates a buffer memory and numeral 15 indicates a switch. Also, the details of the duration training circuit are shown in FIG. 2 and these are described in the previous embodiment.

The operation of a speech recognition apparatus having the aforementioned construction is described in the following.

During reference speech training, previously prepared words of reference speech are split up into single syllables and each syllable is inputted to the speech input terminal 1. This is then analyzed for spectral information which is required by the analysis circuit 2 for recognition purposes. If, for example, an LPC Cepstraum method is used, the spectral information would be calculated from characteristic parameters for an LPC Cepstraum function with a prescribed number being in one group for each frame and this would then be saved in the buffer memory 14. This analysis process is then repeated until a prescribed number of items of speech training data have been dealt with.

The data stored in the buffer 14 is then made into clusterings at the reference speech syllable construction circuit 9 and the item of data at the center of each cluster is stored in the reference syllable storage buffer 12.

Then, at the duration learning circuit 10, the data stored in the buffer 14 is divided up into three classifications, (1) each type of the current syllable within the word, (2) each type of the preceding syllable within the word and (3) each type of syllable of following the above syllable within the word, and the average duration $f_1(n)$, $f_2(n)$ and $f_3(n)$ for each of these classifications is then calculated. To do this, first, the duration of each item of syllable data is calculated by the duration counter 101. For example, the number of items in an LPC Cepstraum coefficient series made for prescribed groups of data items may be counted. Next, the average duration of each type of syllable is calculated at the average duration calculation circuit 102. The ratio of the total length of the speech period for the duration of each of the syllables is then calculated, for each factor, by the speech period total length ratio calculating circuit 103 with equation 4 by using the average duration corresponding to each syllable and the average duration of the total length of the speech period.

A weighting is then added at the weighting addition circuit 104 to the average durations calculated above in the way shown in equation 5 of the previous embodiment, so as to take all of the factors into consideration (In the case of this embodiment, these are the three factors of the preceding syllable type, the current syllable type and the following syllable type). The weighted results are then stored in the duration training results storage buffer 13 every recognition word.

This weighting α can be set up as same as that of the previous embodiment.

At the time of recognition, the speech is input to the input terminal 1 and spectral information is analyzed for every frame at the analyzing circuit 2. The analyzing method is the same as that at the time of training. A speech period is then sensed at the speech period sensing circuit 3 using the 0th LPC Cepstraum coefficient (the 0th coefficient is the speech power information) from the analysis circuit 2. The speech period conditions are in the following two conditions.

(1) Speech power (0th coefficient value) is larger a predetermined value.
(2) more than a certain number of frames fulfilling the condition (1) continue.

The name of the word which is to be recognize is recorded in the word dictionary 11 as a row of syllables. Reference word speech is then made at the reference spoken word construction circuit 4 by linking together reference speech syllables present in the reference syllable storage buffer 12 in accordance with the syllable rows for each word in the word dictionary 11.

Next, such generated reference speech words and the inputted speech are compared at the matching circuit 23. The matching method is the same as that for the prior art example. i.e. the distance D is obtained in accordance with equation 9 of the previous embodiment. M words which has smaller distance D than remaining words are then taken as recognition result candidates. Also, during the matching, each syllable and the frame to which the syllable boundary corresponds are recorded. The distance is measured in Equation 9 by selecting the smaller of the value for Dn−1(i−1)+dn(i) and the value for Dn(i−1)+dn(i), and in the case where the value for Dn−1(i−1)+dn(i) is selected, the value for the frame i becomes the frame corresponding to the boundary between the n−1th syllable and the nth syllable. The boundary frame is indicated as Pn−1 in the following description.

On the other side, the speech period length sensed by the speech period sensing circuit is input to the duration estimation circuit 22. Syllable duration is then estimated at the duration estimation circuit 22 in accordance with equation 2 for claim 4 using the duration estimation value S(n) of each recognition unit for the total length of the speech period and the speech period length L, obtained at the time of training.

Then, at the error calculation circuit 24, the error between the syllable period of the recognition matching results and the syllable period estimation value obtained by the duration estimation circuit is calculated for each of the M word candidates. For example, this may be achieved in the way shown in equation 11.

$$Em = \sum_{n=1}^{N(m)} |\hat{d}n - (Pn - Pn - 1)| \quad \text{[Equation 11]}$$

Em: duration error for word m
d̂n: syllable duration estimation value for the nth syllable
Pn: boundary point between the nth syllable and the n−1th syllable, obtained from the matching results
N(m): total number of syllables for word m Next, by the results evaluation circuit 25, candidates for which the value for the error Em is more than a specified value are removed from the results candidates. The candidate for which the matching result distance is the smallest from amongst the remaining candidates is then taken as the recognition result and output from the output terminal 26.

In the above way, according to this embodiment, at the time of training the duration the average syllable duration is calculated taking into account the factors which influence the syllable duration. This is then used for working out the duration of each of the syllables for the case where the total length of the speech period is taken to be 1. During the recognition process, the syllable duration of the input speech is estimated using equation 2 at the duration estimation circuit using the speech period length of the input speech and the duration of each of the syllables calculated during the training process. The error between the recognition candidate syllable matching period and the estimated value is then obtained using equation 11. By then removing recognition candidates if their error is greater than a fixed value, it becomes possible to establish candidates for recognition only for cases where the difference in duration of every syllable within the same input speech is realistic. This, in turn, makes the apparatus more efficient.

What is claimed is:

1. A speech recognition apparatus which recognizes input speech input to said apparatus, the input speech including plural recognizable units which have a shorter duration than the input speech, said apparatus obtaining a recognition unit corresponding to each recognizable unit and outputting final recognition results by successively connecting each obtained recognition unit, said apparatus comprising:

speech period sensing means for detecting a speech period by sensing a beginning and an end of the input speech;

duration training means for calculating a relationship between durations of recognition units by using influencing factors which influence the duration of the recognition units;

duration estimation means for estimating a duration of each of the recognizable units within the input speech by using the speech period of the input speech detected by the sensing means and a duration relationship calculated by the training means; and matching means for matching a recognition unit to a recognizable unit to produce a final recognition result based upon durations estimated by the estimation means.

2. A speech recognition apparatus according to claim 1, wherein the duration training means calculates the relationship between the durations of the recognition units by obtaining an average duration of recognition units for each influencing factor.

3. A speech recognition unit according to claim 2, wherein the duration training means calculates the relationship between the durations of the recognition units by obtaining, for each of the influencing factors, an extent α, to which the influencing factor affects the duration of the recognition units and obtaining an average duration of the recognition units for each influencing factor.

4. A speech recognition apparatus according to claim 3, wherein the duration training means calculates the duration, S(n), of each recognition unit for such case where a total length of the speech period is taken to be 1, the duration training means obtaining, for each factor, an average duration, $f_j(t)$, of the recognition units and then obtaining a ratio between an average duration of a total speech period length for the input speech and the average duration of each recognition unit by using the obtained average duration, and further assigning weight to and adding together the ratio for each factor, and the duration estimation means calculates estimated values, $\hat{d}(n)$, for the duration of each of the recognizable units of the input speech from $S(n)$ and the total length, $L$, of the speech period, and wherein $$S(n) = \sum_j \alpha_j \frac{f_j(n)}{\sum_{i=1}^{N} f_j(i)}$$

where $f_j(n)$ is the average duration of all recognition units as the nth recognition unit for factor $j$, $N$ is the total number of recognition units included in one speech period, $\alpha_j$ is the weighting coefficient for each factor, and $S(n)$ is the duration estimation value for each recognition unit when the total speech period length is 1, and wherein $$\hat{d}(n) = L \times S(n)$$

where $\hat{d}(n)$ is the duration estimation value for the nth recognition unit, and $L$ is the total speech period length.

5. A speech recognition apparatus according to claim 3, wherein the duration training means calculates the duration, $S(n)$, of each recognition unit for such case where a total length of the speech period is taken to be 1, the training means obtaining an average duration, $f_j(i)$, of the recognition units belonging to the same category for each factor and then estimating the duration of every recognition unit of the input speech by using the obtained average duration and further by obtaining a ratio between the estimated value and the total length of the speech period, and the duration estimation means calculates estimated values for the duration of each of the recognizable units of the input speech from the duration $S(n)$ and said total length of the speech period, $L$, wherein $$S(n) = \frac{f(n)}{\sum_{i=1}^{N} f(i)}$$

where $S(n)$ is the duration estimation value for each recognition unit when the total speech period length is 1, $N$ is the total number of recognition units included in one speech period, and $$f(n) = \sum_j \alpha_j \times f_j(n) \text{ where}$$

$f_j(n)$ is the average duration of all recognition unite as the nth recognition unit for factor $j$, and $\alpha j$ is the weighting coefficient for each factor, and wherein $$\hat{d}(n) = L \times S(n)$$

where $\hat{d}(n)$ is the duration estimation value for the nth recognizable unit and $L$ is the total speech period length.

6. A speech recognition apparatus according to claim 1, wherein the matching means carries out its matching and recognition result determinations using estimated duration values for the recognizable units such that a matching period for a recognition unit is close to an estimated duration value for a matched recognizable unit.

7. A speech recognition apparatus according to claim 1, further comprising matching period deciding means for determining a matching period for each of the recognizable units in the input speech by using estimated duration values for the recognizable units, and wherein the matching means carries out said matching and recognition results decisions such that each of the recognizable units is matched within a matching period determined by the period deciding means.

8. A speech recognition apparatus according to claim 1, further comprising error calculation means for calculating a difference between an estimated duration and a duration of a recognition candidate and results evaluation means for removing recognition candidates based upon a difference calculated by the error calculation means.

* * * * *